PETRI BALDUR BRYK and
JOHAN WILHELM RYSELIN
INVENTORS.

BY Albert M. Parker
ATTORNEY.

Patented Sept. 19, 1950

2,523,092

UNITED STATES PATENT OFFICE 2,523,092

METHOD FOR EXTRACTION OF IRON

Petri Baldur Bryk, Pori, and Johan Wilhelm Ryselin, Harjavalta, Finland

Application December 23, 1949, Serial No. 134,627
In Finland May 2, 1947

8 Claims. (Cl. 75—11)

This invention relates to a method for the recovery of iron from iron silicates, and more particularly to the method of effecting that recovery by reduction of the silicates. This application is a continuation in part of our application Serial Number 756,088 entitled "Method For Extraction of Iron" filed June 20, 1947, now abandoned.

The recovery of iron from iron silicate involves a metallurgical problem for which no economical, effective, solution has heretofore been provided. The need for a solution has become more and more pressing as time has gone on, since not only are deposits or iron in the silicate form available, but, in addition, enormous dumps having a high iron silicate content are found throughout the world in the vicinity of copper smelters. These large dumps contain the slag resulting from the smelting of copper concentrate, or ore, into matte and slag.

In addition to existing sources of iron silicate, the supply from the copper smelters is continuing and, if tapped directly from those smelters, the iron silicate could be obtained already in the liquid state. Here, then, is an opportunity continually going to waste of employing the existing heat content of the raw material in liquid state to assist in extraction of the iron therefrom. Thus the provision of an economically effective method for making this extraction is doubly desirable. To illustrate this point further, let us assume that an iron silicate raw material which is present in liquid state contains 40% iron. The heat content of this would be approximately 300 to 320 kilocalories per kilogram of silicate. Thus, the heat content of 2500 kilograms of iron silicate in liquid state and capable of yielding 1000 kilograms of iron would be approximately 775,000 kilocalories. This heat energy would go a long way in assisting the carrying out of a suitable process.

The employment of solid carbon with liquid iron silicate is so slow that difficulties are encountered in carrying out a reduction process employing solid carbon and liquid iron silicate. To expedite this reaction, it has been proposed to blow finely divided coal into molten iron silicate slag by means of a non-oxidizing gas in order to improve the contact between the coal and slag and thus speed up the process. Iron silicate is here reduced by coal according to equation:

$$2FeO \cdot SiO_2 + 2C = 2Fe + SiO_2 + 2CO$$

The reduced iron collects on the bottom of the furnace, the $SiO_2$ content of the slag increases in turn raising the viscosity thereof, hence the temperature must be raised. The acidity increases and then, with the rise in temperature, promotes the reaction:

$$SiO_2 + 2C = Si + 2CO$$

resulting in the production of ferro silicon.

To enhance the fluidity of the slag and prevent the formation of ferro silicon, it has been proposed to add lime to the molten mass. This addition of lime does enhance the fluidity of the slag, but the process is not economic, since the reduction proper by means of coal proceeds too slowly.

The method of the instant invention enables the reduction process to proceed to full and effective completion in a surprisingly short time and in a manner to make it economical to recover iron from iron silicate ores, as well as from such materials as iron silicate slags. This is accomplished by so heating the raw material and so applying a mixture of lime and carbonaceous material on top thereof, that the conditions correspond to those essential for the formation of calcium carbide right in the furnace itself. When this is done, as pointed out in detail hereinafter, the reduction of iron proceeds smoothly and rapidly to full completion in an economical manner. The carbonaceous material may be provided in such forms as coal, coke, or carbon.

It is, accordingly, the principal object of this invention to provide a method for the reduction of iron in an economical and effective manner from ferro silicate ores and slags.

Another object is to provide such a method which will effect such reduction speedily and smoothly.

More detailed objects of the invention are to provide such methods in which the energy employed is kept at a minimum, in which some of the materials used initially react right in the furnace so that their reaction product will be produced both economically and in its most effective state, and wherein the method by-passes the production of any material which might interfere with carrying it to completion.

Further and more detailed objects of the invention will become apparent as the description thereof proceeds, and also from the description of the accompanying drawing in which there is illustrated a furnace capable of use in carrying out the method of the invention.

In that drawing:

Figure 2 is a section taken on line 2—2 of

Figure 1:
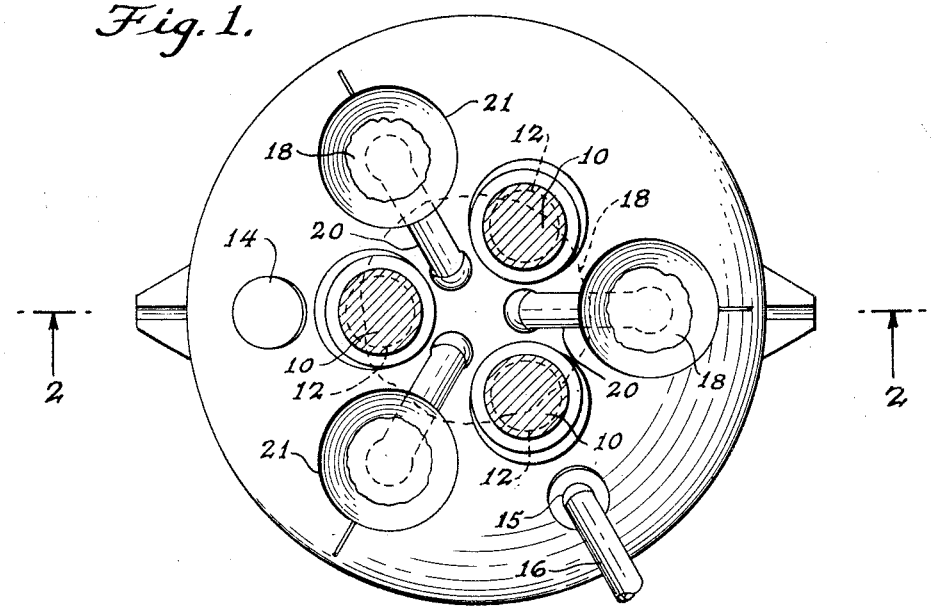
Figure 1 is a plan view of an illustrative form of furnace.

Figure 1, looking in the direction of the arrows.

The furnace illustrated in the accompanying drawing is one which we have found suitable for the carrying out of the method of our invention, and it is believed that a showing of the same assists in an appreciation of an understanding of the invention. Such showing is made, however, for illustrative purposes and the invention is in no way to be considered as limited thereby, since other furnaces can be employed in carrying out the method of the invention.

In the furnace shown, a circular chamber, generally indicated at 1, is provided with a base, or hearth, 2, and an upstanding side wall 3. The bottom 4 of the chamber 1 on which the reduced molten iron collects, as indicated at 5, is provided with a conventional tap hole 6 for running off that iron. Another conventional tap hole 7 is provided part way up the wall 3 for tapping the slag 8. It is, of course, understood by those skilled in the art, that this tapping can be either continuous, or intermittent, depending on whether the furnace is run on a batch, or continuous, basis.

Bridging the side wall 3 is an arched roof, generally indicated at 9, which roof has a plurality of openings therein for the purposes indicated Three of these openings accommodate electrodes 10, which pass through suitable gas-tight collars 11, and are formed at their lower ends with tips 12. The three electrodes employed in this form of furnace are located at the apexes of an equilateral triangle and are preferably symmetrical with respect to the center of the arch 9. The vertical adjustment of these electrodes would, of course, be provided for, as is well known in the art. A charging opening for the silicate raw material is indicated at 13 and as being provided with a lid 14, such as would be employed were the furnace being operated on a batch basis. If, on the contrary, the furnace were being operated continuously, some suitable gas-tight conveyor for either molten, or solid, silicate raw material would be provided. Another aperture provided with a suitable lead-off pipe is indicated at 15, with the pipe as shown at 16 serving to take out the gas formed in the chamber above the slag 8.

The remaining apertures, indicated at 17, are three in number and serve for the introduction of the mixture of lime and carbonaceous material in the furnace on top of the slag 8, and within the electrode zone. Thus, the apertures 17, as here shown, are suitably located intermediate the side of the triangle whose apexes are formed on the center points of the electrodes 10. This location serves, in this form of furnace, to introduce the mixture 18 on top of the slag 2 in the manner generally indicated in Figure 2. The feeding of portions of the mixture 18 to and through the apertures 17 is brought about by the use of suitable screw conveyors 19 operating in a tube 20 communicating with a suitable hopper 21.

The relationships between the position of the tips of the electrodes, with respect to the surface of the molten raw material 8, and of the electrodes themselves, with respect to the pile of mixture 18, are important features in the method of this invention. In the first place, the pile 18 should be deposited upon the upper surface 22 of the raw material 8 in such position as to lie within the electrode zone. This zone may be defined as the area comprised substantially within the outer boundaries of the electrodes. Thus, when three-phase current is employed and is passed through the electrodes 10, sufficient of that current to materially heat the mixture 18 will pass through the pile thereof, and, in fact, will form a multitude of small arcs between particles of that pile. This heating should not, however, be carried to such an extent as to materially dissolve that mixture, for it is important that the mixture remain in substantially solid state ready for the next heating step.

Figure 2:
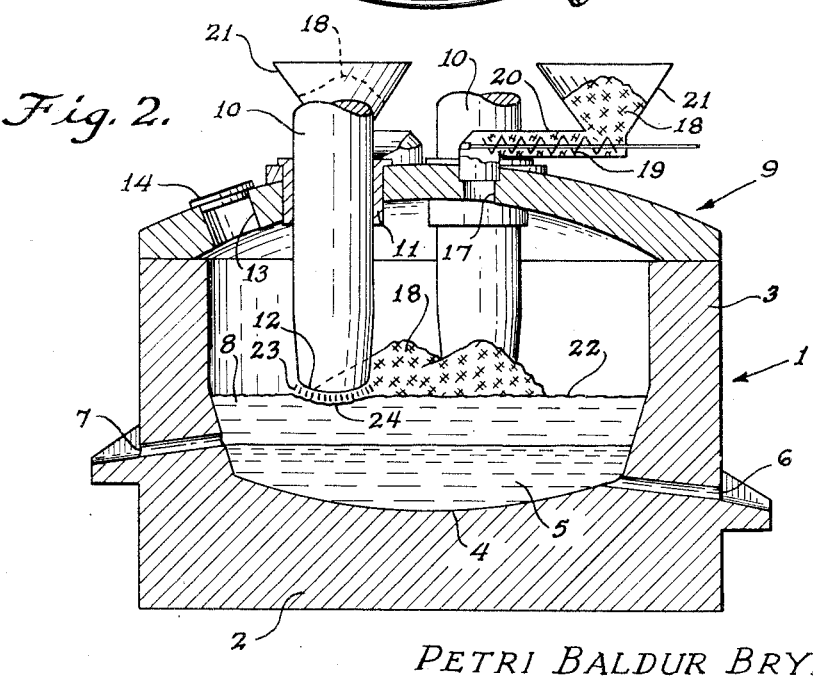

From the Figure 2 showing, it is clear that the tips of the arcs 12 lie above the surface 22 of the raw material 8, rather than being submerged therein. Thus an open arc, indicated at 23, is formed between the tips 12 and the surface 22, which, at this position, causes the surface 22 to be depressed into a shallow crater 24. Again referring to Figure 2, it will be seen that there is sufficient space between the surface of the crater 24 and the tip 12 for material from the pile 18 to flow down into that crater where it can be subjected to the extreme heat of the arc 23. So much for the structure here illustrated for the carrying out of the invention.

To go into more detail with respect to the method of the invention, let us assume that the molten ferro silicate raw material is being poured into a furnace capable of operation the same as, or generally similar to, the furnace illustrated in the accompanying drawing. First, it is, of course, necessary to know the composition of the molten raw material, for the quantity of the lime charge is of great significance with regard to the manner in which the method proceeds. What is aimed at is a final calcium slag with a silicate degree below 2. We have found that for best results the amount of lime added should be such that a slag is produced whose composition lies between that of monosilicate and bisilicate. From practical tests which produced satisfactory results, lime was added in quantities to vary the silicate degree (i. e., the ratio between the oxygen contents of $SiO_2$ and $CaO$), from 1.7 to 1.0. It was also found that the greater the amount of lime added within this range, the easier it was to produce the desired molten iron from the bath. Thus, a silicate degree toward the basic side of the range is to be desired.

The quantity of carbonaceous material added is calculated on the basis of the carbonaceous material needed to give a complete reduction of the iron oxides present.

Assuming then that the carbonaceous material and lime, calculated as just indicated, are mixed together, the quantity thereof must be introduced on to the molten raw material within the electrode zone. With the tips of the electrodes just above the surface of the raw material, and with the current turned on, open arcs will be struck between the tips of the electrodes and the layer immediately thereunder, thus causing the craters to form opposite the tips. Also, as already pointed out, small arcs will form between the particles in the pile of mixture. The mixture of lime and carbonaceous material within the electrode zone will flow into the craters and be subjected to the intense heat of the arcs. We have found it to be essential that the mixture of carbonaceous material and lime must be introduced into the arcs before that mixture dissolves. The effect here is to quickly form reaction intermediaries consisting largely or wholly of calcium carbide directly out of the mixture. The heat of the open arc quickly converts the reaction products into the liquid form, in which form they are highly effective for a reduction of the iron and removal of the silicate, since the reactivity of those products is at its greatest, being at the moment of birth, (in statu nascendi).

The formation of calcium carbide, in the liquid state resulting from the temperatures prevailing in the open arcs and the electrode zone, enables the reduction of iron silicate by the reaction between two liquid components, rather than on a reaction between solid carbon and molten matter. The effectiveness of an intense reducing agent in liquid state is much greater than would be the case if it were solid carbon, and more so because that reducing agent is in statu nascendi. The reducing of the iron silicate, in accordance with the method of this invention, takes place with surprising rapidity. Another surprising fact is that little difference is noticeable in the speed of reaction, whether the percentage of iron in the fused bath is high, or is down to only a few percent.

Another distinctive feature and novelty of the present invention lies in the fact that in the electric furnace during the reduction phase three separate layers can be differentiated: iron on the very bottom, the raw material proper in liquid state and the reduction charge uppermost. This being the case the iron is never made to pass through a layer of flowing carbonaceous material and thus the carbon thereof does not dissolve into the iron.

In the prior methods employing the reaction between carbonaceous material and molten mass for the reduction, it is noticed that the speed of reaction is dependent upon the iron content in the mass and slows down as that content lowers. Such is not the case in the practice of the present method, but, surprisingly, the speed of the reducing process depends solely upon the amount of electric energy employed. In other words, so long as the electric energy remains constant, the speed of reaction is maintained even though the iron content of the bath has been considerably lowered from what it was at the start.

The method of the invention as a whole may be represented by the equation:

$$2\ FeO.SiO_2 + 2C + nCaO = 2Fe + nCaO.SiO_2 + 2CO$$

wherein n must be such that the silicate degree of the resulting calcium slag, as heretofore pointed out, is less than 2. The above equation, for the method as a whole, can be divided into the following intermediate reactions.

1. Lime and carbonaceous material form calcium carbide.

$$CaO + 3C = CaC_2 + CO$$

2. Carbide formed dissolves into additional lime forming a molten mixture for example in the proportion:

$$2CaC_2 + CaO$$

3. This molten mixture reacts with iron silicate in the following manner:

$$3(2FeO.SiO_2) + 2CaC_2 + CaO = 3(CaO.SiO_2) + 6Fe + 4CO$$

4. Rewriting these partial reactions into a total reaction gives us the following which would prevail under ideal conditions.

$$3(2FeO.SiO_2) + 6C + 3CaO = 3(CaO.SiO_2) + 6Fe + 6CO$$

We have conducted tests in order to show clearly the difference between a reducing process by means of carbonaceous material alone, as against reducing by means of the present method. The test using carbonaceous material alone produced results as indicated under the heading of "Tests I" on the table to follow, while the results following the method of the invention are shown under the heading of "Test II."

In both tests the initial material consisted of 700 kilograms of copper furnace slag containing approximately 53% FeO, 31% SiO$_2$ and 6% CaO plus MgO. A preheated furnace was employed in each instance, and in each instance, the temperature of the molten slag was 1300° C. In all other respects, also, identical conditions prevailed at the start of the tests. In Test I, coke alone in the quantity of 150 kilograms was introduced on top of the molten slag. In Test II, 150 kilograms of coke was also employed, but in a mixture with 370 kilograms of burnt lime containing 76% CaO+Mgo. This mixture was added on top of the molten slag. Hence, the materials here correspond to those employed in accordance with the present method.

In each instance, the raw materials in the furnace were subjected to the effects of open electric arcs, just above the surface of the molten slag as heretofore described, and the operation was continued for a period of 100 minutes in each case, with samples extracted and examined for FeO percent of slag at the end of the time increments indicated.

The findings of the tests are as given in the following table:

|  | Test I, FeO% of Slag | Test II, FeO% of Slag |
| --- | --- | --- |
| At beginning of Test | 52.8 | 51.5 |
| After 30 Minutes | 46.1 | 23.2 |
| After 60 Minutes | 36.3 | 2.5 |
| After 100 Minutes | 22.7 | 0.2 |

As indicated by the table, there is a marked variance between the results of the reaction in accordance with Test I and that in accordance with Test II. This variance shows striking advantages in favor of the method of the invention. Another feature of advantage, not apparent on the face of the table, was that at the end of Test I, the temperature of the slag had risen to above 1600° C. Thus, the electric energy fed had gone into the super-heating of the slag, rather than serving to reduce it, as in the Test II procedure, at the end of which latter test the slag remained at substantially its initial temperature.

The results of the tests clearly show that the present invention solves the previous existing metallurgical problem in a surprisingly successful manner. As to the economics of the method, it will also be apparent that the formation of the reaction products, which act as reducing agents, directly in the furnace when the process is being carried out, all as part of one continuous process, introduces the highest degree of economy. Besides economy, the greatest effectiveness of the reaction products is also taken advantage of for they go into action right at the time of birth when they are the most active. We are aware that it has previously been proposed to employ already formed calcium carbide as a reducing agent, and in special cases, to employ it in reducing processes where reduction proper is effected by means of coal. These proposals, however, are uneconomic, due to the cost of already formed carbide, and do not proceed with the speed and effectiveness of the instant invention, since already formed calcium carbide will not pass into the liquid form of the reaction materials here, but will slowly dissolve and react in a manner much less violent than that of the invention method.

The comparatively large quantity of lime added, according to the present method, might be considered from the expense standpoint were it not that the advantages obtained from that quantity of lime are so great. Actually, the method of the invention opens up sources for the production of iron heretofore regarded as without value. These sources, as already pointed out, are silicious iron ores and matting furnace slag. Furthermore, the coupling of the reduction process, in accordance with the invention, with the smelting of copper, to use its ferro silicate slag as raw material in molten state, has a substantial effect on heat economy.

As the final economic advantage resulting from the method of the invention, it is to be pointed out that the residual slag from the method of the invention is lime silicate of basic character. Such material finds a ready market for such uses as mineral manure, or as a raw material for cement making. Its composition is such that it disintegrates by itself, so is usable without involving any crushing or grinding.

It is, of course, understood that it is within the spirit and scope of the invention to use reducing agents which will produce reaction products equivalent to, but differing from, calcium carbide. One example of this would be those productive of barium carbide.

Also, it is of course to be understood that the method of the invention can be carried out either periodically, or substantially continuously. That is, the iron or slag from the furnace may be tapped either continuously from the zone in which reduction has been completed, or intermittently, at suitable time intervals.

It is also important in the recovery of iron from raw material to obtain a yield as free of sulphur as possible. Matting furnace slag, is normally relatively rich in sulphur, so that if it is used as the raw material in the present method, desulphurization is an important additional step. Since, however, the present method calls for a slag composition of basic character, conditions favorable to desulphurization are present.

In the initial phase of reduction, in accordance with the invention, the sulphur content in the fused bath passes chiefly into the iron. With decreasing FeO content, however, the sulphur returns to the slag and the greater the lime content, the sooner desulphurization sets in. After the iron has been reduced, a calcium carbide bearing lime silicate is obtained. This is very effective for desulphurization, and on continuing the process to complete the reduction proper, sulphur is taken up by this desulphurization and an iron yield practically free of sulphur is obtained.

Since certain changes may be made in carrying out the above method, or process, without departing from the spirit or scope of the invention, it is of course to be understood that all matter contained in the above description shall be interpreted as illustrative and not in a limiting sense.

Having described our invention, what we claim is new and desire to secure by Letters Patent is:

1. A method for reducing iron from ferro silicate raw material which comprises, providing such raw material in molten state, applying a charge composed of a mixture of lime and carbonaceous material in solid state on the top of said raw material, heating said charge on top of said raw material to produce calcium carbide in liquid state, causing said liquid calcium carbide to be taken into said raw material and to reduce the silicate, and collecting the iron resulting from such reduction beneath said raw material.

2. A method for reducing iron from ferro silicate raw material which comprises, providing such raw material in molten state, applying a charge composed of a mixture of lime and carbonaceous material in solid state on top of said raw material, forming a high intensity electric arc above the surface of said raw material, flowing said charge into said arc to quickly change the same into reaction products of lime and carbonaceous material in liquid state, causing said liquid reaction products to be taken into said raw material and to reduce the silicate, and collecting the iron resulting from such reduction beneath said raw material.

3. A method for reducing iron from ferro silicate raw material which comprises, providing said raw material in molten state, applying a charge composed of a mixture of lime and carbonaceous material on the top of said raw material, heating said charge on the top of said raw material to a substantial extent without substantially dissolving the same, suddently subjecting said preheated charge portion by portion to an intense heating action on the surface of said raw material to heat and react the lime and carbonaceous material in said mixture and produce reaction products thereof in liquid state, causing said liquid reaction products to be taken into said raw material and to reduce the silicate and collecting the iron resulting from said reduction beneath said raw material.

4. A method for reducing iron from ferro silicate raw material which comprises, providing such raw material in molten state, applying a charge composed of a mixture of lime and carbonaceous material on the top of said raw material, heating said mixture to a substantial extent without materially dissolving the same, forming electric arcs at the surface of said raw material at positions adjacent the boundary of said charge, flowing said heated charge into said arcs to transform the mixture thereof into liquid reaction products of lime and carbonaceous material, causing said liquid reaction products as soon as formed to be taken into said raw material and to reduce the silicate and collecting the iron resulting from such reduction beneath said raw material.

5. A method for reducing iron from ferro silicate raw material which comprises, providing such raw material in molten state, applying a charge composed of a mixture of lime and carbonaceous material on the top of said raw material, heating said mixture to a substantial extent without materially dissolving the same, forming electric arcs at the surface of said raw material at positions adjacent the boundary of said charge, flowing said heated charge into said arcs to transform the mixture thereof into liquid reaction products of lime and carbonaceous material, including calcium carbide in liquid form, causing said liquid reaction products as soon as formed to be taken into said raw material and to reduce the silicate and collecting the iron resulting from such reduction beneath said raw material.

6. A method for reducing iron from ferro silicate raw material which comprises, forming a bath of said raw material in molten state, mixing together carbonaceous material and lime in the quantities required to produce reaction products capable of reducing said silicate raw material and of leaving a resulting slag with a silicate ratio of less than 2, and introducing the same in solid state on top of said bath of molten raw material, heating the body of said mixture to a substantial extent, quickly heating portions of said mixture to a substantially higher temperature to react said carbonaceous material and lime and produce reaction products thereof in liquid state, introducing said reaction products into said raw material to reduce said silicate, collecting the iron reduced from said silicate beneath said layer of raw material and drawing off said iron from beneath said raw material.

7. A method for reducing ferro silicate raw material which comprises, providing such raw material in molten state in an electric furnace, applying a reduction charge composed substantially of lime and carbonaceous material on to the top of the said molten raw material, reacting the materials of said reduction charge to produce reaction products in liquid state, reducing said raw material by means of said liquid reaction products of said reduction charge, and collecting the iron from said raw material below the layer of raw material to protect said iron from contact with the carbonaceous material of said reduction charge, whereby the operation proceeds in three layers with the reduction charge as the uppermost layer, the raw material silicate layer as the intermediate one and the free iron as the lowermost layer.

8. A method for reducing ferro silicate raw material, which comprises providing such raw material in molten state in an electric furnace, applying a charge composed substantially of a mixture of lime and carbonaceous material over the top of said molten raw material and heating the materials of said charge on the top of said molten raw material for obtaining a reduction charge containing reaction products of lime and carbonaceous material in liquid form, and to reduce said raw material by means of said reduction charge thus obtained, collecting the iron from said raw material below the layer of raw material to protect said iron from contact with the carbonaceous material of the unreacted portion of said reduction charge whereby the operation proceeds in three layers with the reduction charge as the uppermost layer, the raw material silicate layer as the intermediate one and the free iron as the lowermost layer.

PETRI BALDUR BRYK.
JOHAN WILHELM RYSELIN.

REFERENCES CITED

The following references are of record in the file of this patent:

UNITED STATES PATENTS

| Number | Name | Date |
|---|---|---|
| 1,296,384 | Hamilton | Mar. 4, 1919 |
| 1,300,410 | Johnson | Apr. 15, 1919 |
| 1,319,061 | Garred | Oct. 21, 1919 |
| 1,471,270 | Kuzell | Oct. 16, 1923 |
| 2,350,725 | Cavanagh | June 6, 1944 |

FOREIGN PATENTS

| Number | Country | Date |
|---|---|---|
| 946 | Great Britain | of 1891 |
| 236,255 | Great Britain | July 6, 1925 |
| 59,975 | Sweden | Oct. 4, 1922 |